United States Patent Office 2,894,476
Patented July 14, 1959

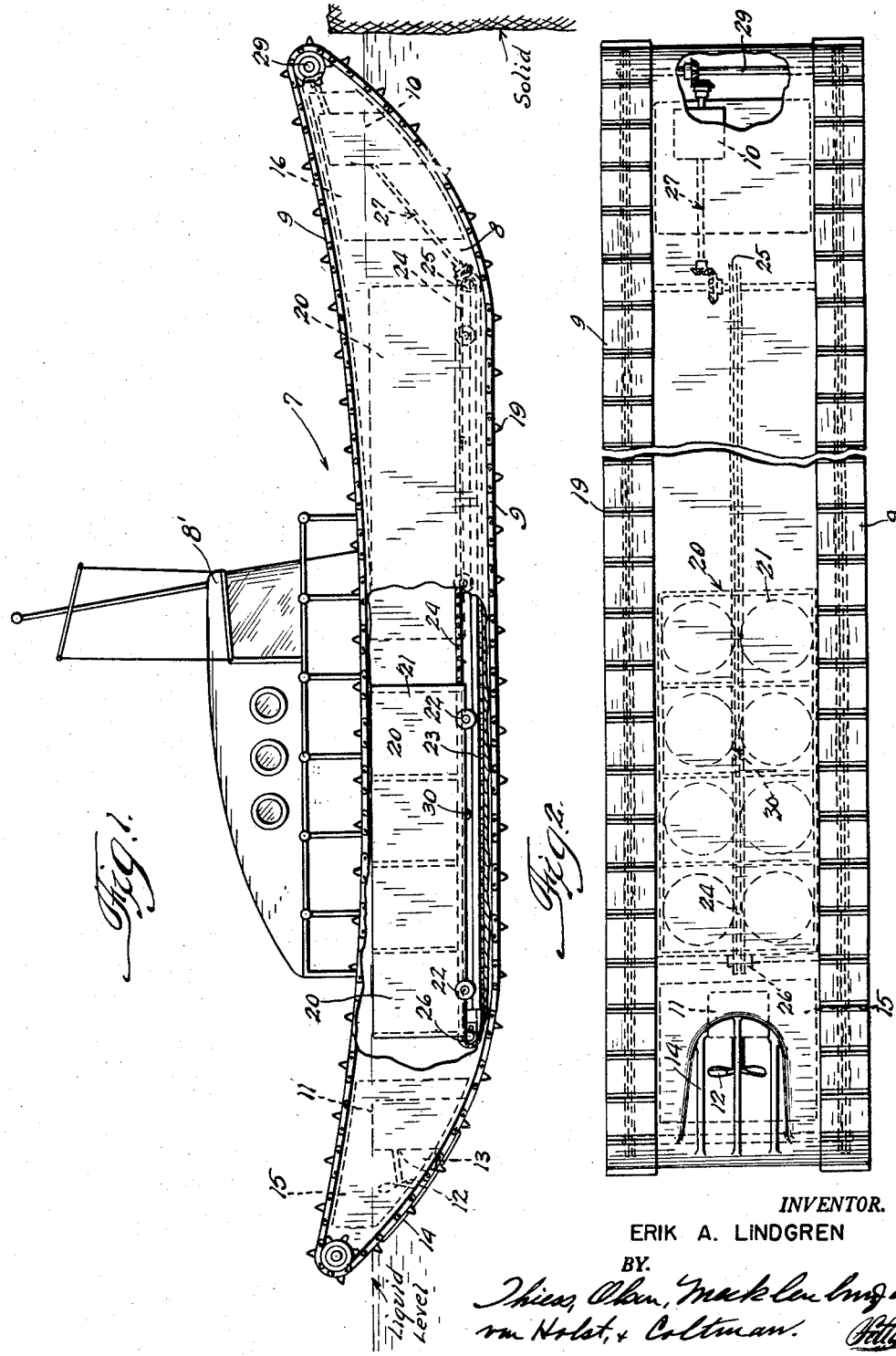

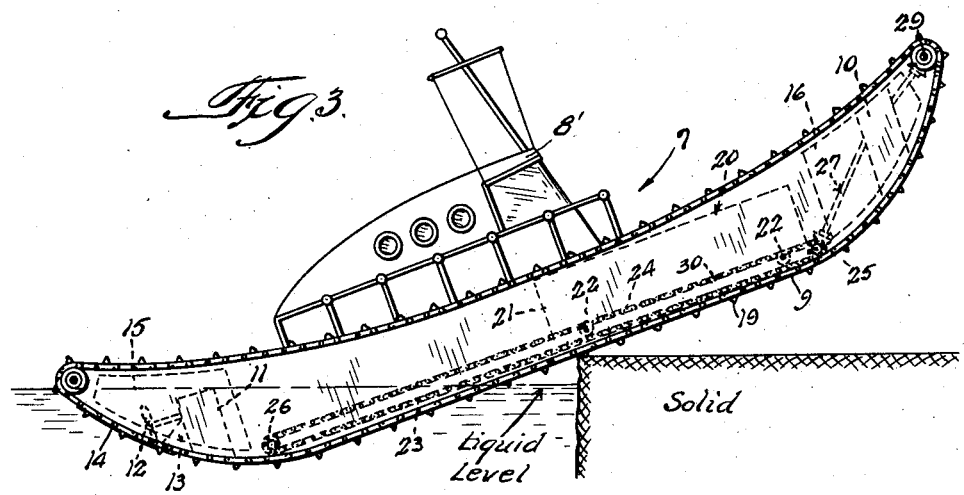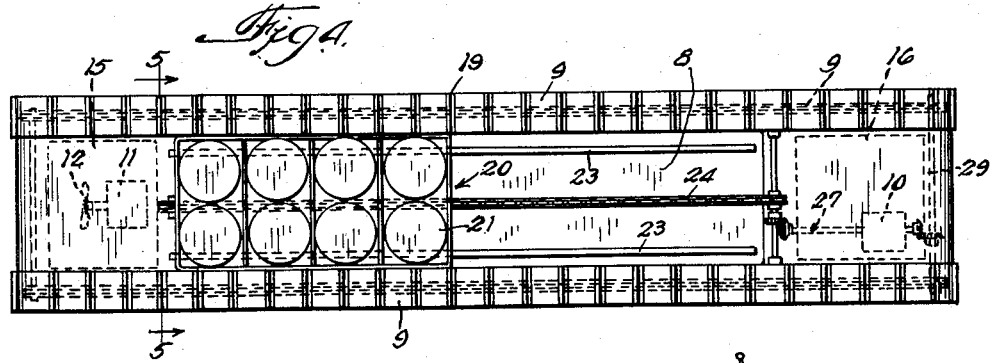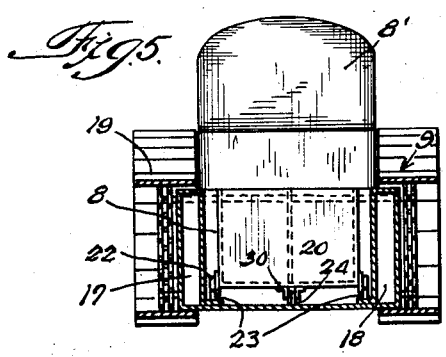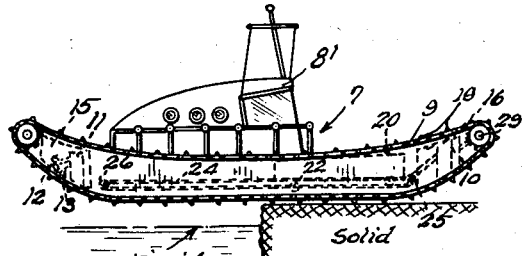
INVENTOR.
ERIK A. LINDGREN

2,894,476

VEHICLE CAPABLE OF TRANSFERRING ITSELF FROM A LIQUID TO A SOLID SUPPORTING MEDIUM

Erik A. Lindgren, Chicago, Ill.

Application November 23, 1953, Serial No. 393,809

4 Claims. (Cl. 115—1)

The present invention relates to a vehicle which is capable of readily transferring itself from a liquid to a solid supporting medium and vice versa.

It has more particular relation to a type of boat which is capable of mounting a solid support, elevated somewhat above the water level, and of traveling thereon, and perhaps again entering the water.

The invention has for its more immediate object a boat which may travel on water by means of the usual type of propelling means, but may, for example mount upon an ice floe or ice surface and continue its travel thereon, perhaps again descending into the water, again climbing onto the ice, and of repeating this at any time as required.

The vessel about to be described may be used for landing operations on either solid land or on ice, and is provided with means which greatly facilitate the transfer of the boat to the ice or land.

It is well known that a vessel may be constructed which can be propelled on land and water by means of caterpillar types of tracks and therefore used as an assault or transport vessel whereby rapidly to transfer men and supplies to shore. In most such cases, however, it is of essence that the shore be a gradually sloping one, such as a beach, as otherwise the boat cannot readily climb out of the water.

Accordingly, it is one of the objects of the present invention to provide a boat which can readily climb up onto a solid surface, even though the latter be either steeply inclined or even flat, but on a higher level than the water.

This is accomplished, in accordance with the present invention by providing means in or on the boat whereby its longitudinal center of gravity may be shifted at will, so as to place the greater weight either forward or astern, whereby it will become possible to lift the stern out of the water by the overbalancing of the weight of the stern by a forward shift of the boat's center of gravity.

Thus, generally speaking, the boat may be provided with either movable weights, or, much more practically, with cargo-carrying containers or bins, which are so mounted with reference to the hull of the vessel that they may be shifted far forward or far astern under the control of the boat's operators.

This may be effected by providing a water-tight hull, means exterior thereof to move the hull on a solid support, such as land or ice, comprising the usual type of Caterpillar tracks, and also providing cargo-carrying bins which ride on rails or the like, laid on the bottom of the hull, together with means for moving these bins forwardly and backwardly, so that the center of gravity of the boat may be shifted far enough toward the bow to counterbalance the weight of the stern, or at least to reduce its relative weight to a degree where the Caterpillar tracks are enabled to lift the boat out of the water and onto the land or ice. Conversely, when descending again to the water, corresponding changes in the position of these bins may be effected, so allow the boat to return to the water without danger of submerging the bow portion thereof as a result of such an operation.

In its simplest embodiment, the boat may be provided with one or more prime movers, such as engines or motors, which are suitably coupled to the Caterpillar driving means and to the means for shifting the ballast along the longitudinal axis of the boat. If desired, additional means of propelling the boat while riding on the water may be provided, such as the usual kind of propeller. These means may be independently driven or all moved by the same prime mover.

The invention is illustrated in a number of drawings in which:

Fig. 1 is a side-elevation of the vessel while riding on an even keel in water;

Fig. 2 is a bottom plan view thereof, partially sectionalized;

Fig. 3 is a side view showing the vessel just about the time at which it leaves the water;

Fig. 4 is a top plan view showing particularly the weight-shifting means;

Fig. 5 is a cross section along the line 5—5 of Fig. 4; and

Fig. 6 is a side view, on a somewhat reduced scale, of the vessel when entirely supported on a solid surface out of the water.

The boat or vessel 7 comprises a water-tight hull 8 and a superstructure 8', if desired. The hull serves to house the prime movers and the cargo-carrying instrumentalities and the crew and passengers. On the outside of the hull 8 at the sides thereof there are provided two longitudinally extending Caterpillar tracks 9 which are coupled, in the entirely well known manner, to an engine or motor 10 which serves to actuate them. There is also provided an auxiliary driving means comprising a second engine or motor 11 which is connectable with the usual type of propeller 12. A rudder 13 serves to steer the vessel when it is traveling on water.

In order to protect the propeller and rudder at such times as the boat is traveling on a solid surface, metallic bars or grill 14 may be provided. When the boat is in the water, both the propeller and rudder will be sufficiently submerged to enable the propulsion and steering thereof. In order further to improve the buoyancy of the boat, watertight compartments 15, 16, 17 and 18 may be provided along both sides and at each end thereof. The latter are shown on Fig. 5.

The hull 8 and superstructure 8' of the boat are preferably made relatively light in comparison with the shiftable cargo or weights, so that the proper stern-lifting action may be more readily accomplished. The superstructure may be omitted if the boat is to be made in relatively small sizes; but, in any event, it is not essential to the novel features of the present invention, and hence is not described in detail.

Preferably, and particularly when the vessel is intended to climb a slippery surface such as an ice field or ice floe, the Caterpillar tracks are provided with cleats 19 which serve better to grip the ice and to draw or push the vessel onto the ice.

The essential feature which distinguishes the present invention from prior proposals is the presence within the hull of the movable mass 20, which may comprise suitable bins 21 which are mounted on wheels 22 movable upon the rails 23 by means of an endless chain 24, which is suitably secured to the bins, and which travels around pulleys or sprocket wheels 25 and 26. The latter is operatively connected through a clutch and transmission mechanism 27 with one of the prime movers, for instance the prime mover 10 which also serves to actuate the Caterpillar tracks 9 through shaft 29. The cargo, or if desired merely suitable weights 20, is contained in the bins 21.

When the vessel is floating on water and is being propelled by the engine 11 and propeller 12, it will ride along on a more or less even keel, with the bow some distance out of the water. If either land or an ice floe or ice field be encountered which would interfere with the further progress of the vessel, the Caterpillar tracks 9 are also brought into motion, and, as the bow of the vessel encounters the edge of the ice surface, it will tend to ride up thereon, thus canting the vessel backward, until it assumes a slanting position such as is shown in Fig. 3. Let it be assumed that by that time the vessel will be about one-half out of the water. Under normal circumstances the tracks 9 would then begin to slip and further progress of the vessel would be substantially prevented. However, the operator will then operate a gear driven by the shaft 27 to actuate chain 24 which is attached to the bins at 30 in such a manner that the cargo or weight-carrying bins 20 will be moved toward the bow of the vessel, thus shifting its center of gravity forward. Eventually the bins may assume the position shown in Figs. 3 and 6 (and as also shown in dotted lines in Fig. 1). Now if the weight be properly chosen, this may be great enough, more or less or even completely, to overbalance the weight of the rearward portions of the vessel with the result that it will now tilt forwardly, so that the stern will be lifted out of the water, or at least it will become possible for the Caterpillar tracks to lift the vessel completely out of the water onto the ice surface.

This ability to shift the center of gravity by moving the cargo or weights has a further advantage in that it serves to help submerge the ice, if it be floating, or, if it be thin enough, to have the combined weight of the vessel plus its cargo to break the ice so that further progress of the vessel in the water becomes possible.

After the vessel is entirely supported on a solid surface, such as ice or land, it may be desirable to shift its center of gravity back to the center or even toward the rear. This ability to shift the cargo or weight to any desired point also will help to get the vessel over humps in the ice. In any event, the ability to rock the vessel over humps in the ice. In any event, the ability to rock the vessel over an obstruction constitutes a further advantage of the present invention.

When it is desired to have the vessel re-enter the water, the weight may be shifted further back, or may remain at any desired position along the longitudinal axis of the vessel, so that as the bow of the vessel slides back into the water, there will not be too great a weight on the forward portions.

The navigation of areas of floating ice hence becomes a simple matter for such a vessel. Self-evidently it can likewise be used, for example, in landing operations where there is a breakwater or the like protruding somewhat above the surface of the water, and which would otherwise hinder the operation of an ordinary vessel. For the same reasons, the vessel could be used to surmount reefs or relatively flat obstructions in the water.

While a chain 24 and a prime-mover 10 have been described as the means for shifting the weight-carrying means, it will be evident that other means may be employed to effect the movement thereof, as for instance a screw and cooperating means, whereby, on turning the screw, the weights may be moved back and forth as desired. In any event, good braking means whereby to keep the weight carrying bins or carriages in any desired position are essential; but as such brake mechanisms are well known, they are not illustrated in detail.

The vessel may be made of any suitable size, from a small assault craft or rescue boat to a relatively large cargo-carrying ship; provided only that it be equipped with the means for shifting the center of gravity forward and backward in accordance with the hereinabove expressed principles.

Mechanical details of construction, well within the skill of ship-builders and engineers have been omitted for sake of simplifying the description of the invention, as such details may be readily supplied by those skilled in the art.

Accordingly, I claim:

1. A vehicle capable of traveling while supported on either a solid or liquid medium and of transferring itself from one of said media to the other at the juncture thereof comprising a liquid-tight body, means for imparting translatory movement thereto in either medium comprising a propeller and endless Caterpillar tracks mounted on said body, prime movers for said means, said Caterpillar tracks further serving to transfer said vehicle from the liquid to the solid medium and from the solid medium to the liquid medium at the respective junctures thereof, a movable mass within the body of said vehicle and normally disposed so as to maintain a balanced fore-and-aft condition of said vehicle while in such liquid medium, and means for shifting the position of said mass substantially forward of the center of gravity of such vehicle to a point where said mass overcomes the preponderance of said vehicle aft of such center of gravity when said vehicle is moving from a liquid to a solid medium and for shifting the position of said mass substantially rearwardly of such center of gravity to a point where said mass balances the preponderance of said vehicle forward of such center of gravity when said vehicle is moving from a solid medium to a liquid medium.

2. A vehicle capable of traveling while supported on either a solid or liquid medium and of transferring itself from one of said media to the other at the juncture thereof comprising a liquid-tight body, means for imparting translatory movement thereto in either medium comprising endless Caterpillar tracks mounted on said body, prime movers for said means, said Caterpillar tracks further serving to transfer said vehicle from the liquid to the solid medium and from the solid medium to the liquid medium at the respective junctures thereof, rails extending on the inside of said body along the longitudinal axis thereof, load-carrying bins reciprocable on said rails and normally positioned so as to maintain a balanced fore-and-aft condition of said vehicle in such liquid medium, and means for shifting the position of said bins substantially forward of the center of gravity of such vehicle to a point where said bins overcome the preponderance of said vehicle aft of such center of gravity when said vehicle is moving from a liquid to a solid medium and for shifting the position of said bins substantially rearwardly of such center of gravity to a point where said bins balance the preponderance of said vehicle forward of such center of gravity when said vehicle is moving from a solid medium to a liquid medium, said last-mentioned means being associated with coupling means operatively connected with the means for actuating said Caterpillar tracks.

3. The vehicle as defined in claim 1 in which the coupling means comprise a clutch.

4. The vehicle as defined in claim 1 when also provided with an independently driven screw propeller to propel it when floating in the water.

References Cited in the file of this patent

UNITED STATES PATENTS

| | | |
|---|---|---|
| 1,188,842 | Schrumpf | June 27, 1916 |
| 1,682,764 | Mohr | Sept. 4, 1928 |
| 2,551,967 | Pouliot | May 8, 1951 |